United States Patent Office 3,376,343
Patented Apr. 2, 1968

3,376,343
SALTS AND ACIDS CONTAINING THE $B_{10}H_{12}CH^-$ OR $B_{10}H_{10}CH^-$ ANION
Walter H. Knoth, Jr., Mendenhall, Pa., assignor to E. I. du Pont de Nemours and Company, Wilmington, Del., a corporation of Delaware
No Drawing. Filed May 3, 1966, Ser. No. 547,153
9 Claims. (Cl. 260—567.6)

This invention relates to polyboron compounds and their preparations. More specifically, the invention concerns carboranes having 10 boron atoms and 1 carbon atom in the nucleus.

The novel compounds of this invention can be represented by the formulas (1) $\quad M[B_{10}H_{12}CH]$ and (2) $\quad M[B_{10}H_{10}CH]$ wherein $[B_{10}H_{10}CH]$ and $[B_{10}H_{12}CH]$ represent novel anions having a valence of $-1$, and M is a cation selected from the class consisting of hydrogen, an alkali metal, one equivalent of an alkaline-earth metal, ammonium, aliphatically saturated hydrocarbyl-substituted ammonium, and tri(aliphatically saturated hydrocarbyl-substituted)sulfonium.

"Aliphatically saturated hydrocarbyl" is defined as a hydrocarbyl group that is free of any aliphatic unsaturation, i.e., the only unsaturation which may be present is aromatic. Thus, the substituents on the ammonium or sulfonium cations can be alkyl, cycloalkyl, aryl, alkaryl, aralkyl, and the like.

The hydrocarbyl-substituted ammonium or sulfonium cations can be represented by the formulas $RNH_3^+$, $RR'NH_2^+$, $RR'_2NH^+$, $RR'_3N^+$, and $R_3S^+$ wherein R is aliphatically saturated hydrocarbyl and R' is aliphatically saturated hydrocarbyl bonded to N through an aliphatic carbon atom. Preferably, R and R' each contain 1 through 18 carbon atoms. Any two R and R' groups in the same cation can also be joined together (bonded covalently) directly or through an ethereal oxygen atom to form a divalent aliphatically saturated hydrocarbon group or oxygen-interrupted (mono-oxa) hydrocarbon group of 4 through 12 carbon atoms (preferably 4 through 8 carbon atoms).

Examples of the cations (M) include sodium, potassium, rubidium, barium, calcium, strontium, magnesium, cesium, methylammonium, cyclopropylammonium, 1-methylheptylammonium, 2-(1-naphthyl)ethylammonium, octadecylammonium, p-ethylanilinium, diisobutylammonium, dicyclohexylammonium, dinonylammonium, morpholinium, dodecamethyleniminium, triisopropylammonium, N-methylpiperidinium, trihexylammonium, dodecyldimethylammonium, tetraisopentylammonium, heptyltrimethylammonium, trimethylphentylammonium, cyclodecyltrimethylammonium, dimethyloctadecylsulfonium, methyltetramethylenesulfonium, triethylsulfonium, N,N - didodecylmorpholinium, dimethylanilinium, triphenlysulfonium, and the like.

Of the above R and R'-substituted cations, the ammonium cations are preferred because of availability. For the same reason, those containing only lower alkyl (1–8 carbon atoms) are preferred, especially tetramethylammonium and trimethylammonium. The most preferred cations are hydrogen and the alkali metals, especially cesium.

Compounds of the above formulas in which M is hydrogen are ordinarily isolated as solvates. Since these compounds are most commonly worked with in aqueous media, the most common types of solvates are hydrates. The exact position of attachment of the solvate molecules is not known, but at least some of them are almost certainly associated with the hydrogen ions. It is to be understood, therefore, that the term "hydrogen," as used here, includes, and in fact essentially always refers to, hydrogen ions solvated with water or other solvent molecules. When M is hydrogen, the degree of solvation of the hydrogen ion is of no particular importance to the present invention. The above usage of the term "hydrogen" is based on nomenclature approved by the International Union of Pure and Applied Chemistry; see J. Am. Chem. Soc., 82, 5529–30 (1960).

The novel compounds of this invention wherein M is sodium, lithium or potassium are prepared by its process aspect which comprises reacting a compound of the formula $$B_{10}H_{12}CNR_3$$

wherein each R is of up to 18 carbon atoms and is selected from alkyl, cycloalkyl or aralkyl, bonded to the nitrogen through carbon bearing at least one hydrogen; with sodium, lithium or potassium in an inert solvent, preferably a saturated bis aliphatic diether of up to 8 carbon atoms. Representative ethers include tetrahydrofuran, diethyl ether, dibutyl ether, dioctyl ether, 1,4-dioxane, diethylene glycol diethyl ether, 1,2-dimethoxyethane, and the like. Preferably, R in the reactant is lower alkyl, i.e., contains 1–6 carbon atoms. This reaction is carried out at temperatures between 35–150° C., and preferably between 55–100° C. Pressure and reaction time are not critical and will depend upon the temperature and the solvent used. Because free alkali metal is employed, a nitrogen atmosphere is usually provided as a safety precaution. The $B_{10}H_{12}CNR_3$ reactant is prepared as described in copending application Ser. No. 463,336, filed June 11, 1965, in the name of Walter H. Knoth, Jr., by treating $CsB_{10}H_{13}CN$ with dilute HCl or an acid ion-exchange resin, followed by dioxane, and then reacting the resulting precipitate with sodium hydroxide and a hydrocarbylating agent such as a dialkyl sulfate. The $CsB_{10}H_{13}CN$ compound is prepared as described in J. Inorg. Nucl. Chem. 20, 66 (1961).

The products of this invention are both obtained by the above-described procedure. They can be separated by conventional procedures based on the different solubilities with a common cation, as shown in the examples.

Once the salts of this invention have been obtained by the procedures described above, they can be converted to any other salt or acid of the invention by cation-exchange methods. For example, the salts of the invention obtained by the procedures described above will usually be the Rb+, Cs+, RR'₂NH+, RR'₃N+ or R₃S+ salts because they are relatively insoluble in water and are thus most easily obtained. These salts can then be subjected to conventional cation-exchange techniques to obtain other salts or acids of the invention. For example, cation-exchange resins can be prepared containing the desired cation (e.g., hydrogen, sodium, ammonium, and the like), and a solution of the salt whose cation is to be replaced passed through. For example, a sodium-ion-exchange resin for making sodium salts is made from a commercial, sulfonated styrene-copolymer cation-exchange resin (such as "Rexyn" 101 (H)) by passing aqueous sodium chloride through a column filled with the resin until the effluent is no longer acidic and then washing the resin free of chloride ion with water. Cation-exchange resins containing other alkali metals or alkaline-earth metals in place of sodium can be made in the same way by substituting a soluble salt containing the desired cation for sodium chloride and thus other alkali-metal or alkaline-earth-metal salts of the invention can be obtained by passing a solution containing $B_{10}H_{12}CH^-$ or $B_{10}H_{10}CH^-$ through a column containing such a resin and evaporating the effluent. Compounds wherein M is hydrogen are obtained using an acidic ion-exchange resin. Alternatively, once the acids of this invention (i.e., where M is hydrogen) are obtained, they can be treated with an equivalent amount of a hydroxide containing the desired replacing cation. When the replacing cation is $NH_4^+$, $RNH_3^+$, $RR'NH_2^+$ or $RR'_2NH^+$, then anhydrous ammonia or the appropriate anhydrous amine can be used for the neutralization instead of the hydroxide. The water can then be evaporated leaving the desired salt. In addition, when the base is volatile, an excess can be used and any remaining can be removed by evaporation.

The cation is present solely to fulfill the valence requirements of the anion, and is otherwise not a critical part of this invention. There are several formulation systems for denoting the presence of the carbon atom as a part of the skeletal structure, e.g., $B_{10}H_{10}CH^-$, $B_{10}H_{11}C^-$, $CB_{10}H_{11}$. The first type has been used herein because it shows that one hydrogen is bonded directly to the carbon atom.

The products and processes of this invention are illustrated in further detail in the following examples:

Example I

A mixture of $B_{10}H_{12}CN(CH_3)_3$ (2.6 g.) and sodium wire (1 g.) in 100 ml. of anhydrous tetrahydrofuran was refluxed in a nitrogen atmosphere for 3 hours and then allowed to stand at ambient temperature for approximately 16 hours. Several grams of sodium dispersion (50% in oil) was added and the mixture was refluxed an additional 4 hours. It was then allowed to cool. The supernatant liquid which contained $NaB_{10}H_{10}CH$ in solution, was decanted. The residue was slowly and cautiously mixed with water (100 ml.) and the resulting solution was extracted with ether. Shaking the ether layer with aqueous tetramethylammonium chloride precipitated $(CH_3)_4NB_{10}H_{12}CH$ which was recrystallized from 50% aqueous alcohol.

*Analysis.*—Calcd. for $(CH_3)_4NB_{10}H_{12}CH$: B, 52.2; C, 29.0; H, 12.1; N, 6.8. Found: B, 51.0; C, 28.6; H, 12.1; N, 6.7. U.V.: No max.

The infrared absorption spectra in microns was as follows (taken in mineral oil, frequencies characteristic of mineral oil and the C—H bonds of the cation omitted): 4.0 (strong, B—H), 7.75 (w), 9.10 (m), 9.35 (m), 9.85 (m), 10.0 (m), 10.25 (w), 10.53 (m), 10.95 (w), 11.35 (w), 11.65 (w), 11.9 (w), 12.20 (w), 13.25 (m), 13.75 (w), and 14.05 (w).

Example II

A mixture of $B_{10}H_{12}CN(CH_3)_3$ (5.8 g.) and sodium dispersion (3.5 g. of 50% sodium in oil) in 125 ml. of anhydrous tetrahydrofuran was refluxed in a nitrogen atmosphere for 4¼ hours. The mixture was filtered and the filter cake was added slowly to 150 ml. of water with stirring. The resulting solution was filtered through diatomaceous earth ("Celite"). Three-quarters of the filtrate was treated with excess trimethylammonium chloride to precipitate a solid which was crystallized from water to obtain 1.5 g. of $(CH_3)_3NHB_{10}H_{12}CH$. $NaB_{10}H_{10}CH$ was present in the original filtrate.

*Analysis.*—Calcd. for $(CH_3)_3NHB_{10}H_{12}CH$: B, 56.0; C, 24.9; H, 11.9; N, 7.2; H by evolution, 2330 ml./gm.; app. mol. wt. 96.5 (apparent; formula weight divided by number of ions per molecule); N.E. 193. Found: B, 56.1; C, 25.4; H, 12.3; N, 7.2; H by evolution (platinum-catalyzed hydrolysis), 2358, 2374 ml./gm.; app. mol. wt. 94 (ebull. in acetonitrile); N.E. 200.

The neutral equivalent was determined by passage of the product through a strongly acidic ion exchange column followed by titration of the effluent solution with sodium hydroxide. The first step gave a solution containing $HB_{10}H_{12}CH$; the titration gave a solution containing $NaB_{10}H_{12}CH$ Example III A mixture of $B_{10}H_{12}CN(CH_3)_3$ (15 g.), 9 g. of sodium dispersion (50% in oil) and 300 ml. of tetrahydrofuran was refluxed two hours in a nitrogen atmosphere. The mixture was filtered under nitrogen and the filtrate was evaporated under reduced pressure in a stream of air. The evaporation residue was stirred in 100 ml. of water and the resulting solution was filtered. The addition of 10 g. of trimethylammonium chloride precipitated 10 g. of $(CH_3)_3NHB_{10}H_{10}CH$. Two grams of this product was dissolved in ethanol.

The addition of excess tetramethylammonium hydroxide precipitated $(CH_3)_4NB_{10}H_{10}CH$, which was recrystallized from aqueous alcohol.

$NaB_{10}H_{12}CH$ remained in the filter cake of the first filtration.

*Analysis.*—Calcd. for $(CH_3)_4NB_{10}H_{10}CH$: B, 52.7; C, 29.3; H, 11.2; N, 6.8; app. mol. wt. 102; H by evolution, 2080 ml./gm. Found: B, 52.8; C, 28.3; H, 11.2; N, 6.8; app. mol. wt. 98; H by evolution 2090 ml./gm.;

$U.V. \lambda_{max}^{CH_3CN}$ 289 ($\epsilon$ 123), 235 ($\epsilon$ 3200)

The infrared absorption spectrum was consistent with the assigned structure and was as follows (taken in mineral oil, frequencies characteristic of mineral oil and the C—H bonds of the cation omitted): 4.0 (strong; B—H), 7.75 (w), 8.88 (m), 9.75 (w), 10.1 (w), 10.55 (m), 11.8 (w), 12.3 (w), 13.0 (w), and 13.8 (w) $\mu$.

Example IV

A mixture of $B_{10}H_{12}CN(CH_3)_3$ (14 g.), 9 g. of sodium dispersion (50% in oil) and 300 ml. tetrahydrofuran was refluxed for three hours in a nitrogen atmosphere. The reaction mixture was cooled and filtered. Dissolution of the filter cake in alcohol followed by the addition of tetramethylammonium chloride precipitated $(CH_3)_4NM_{10}H_{12}CH$ as shown by infrared analysis. The filtrate from the crude reaction mixture was concentrated to a small volume and filtered again. The precipitation of a tetramethylammonium salt from this filtrate gave a mixture of $(CH_3)_4NB_{10}H_{12}CH$ and $(CH_3)_4NB_{10}H_{10}CH$ as shown by infrared analysis.

Example V

A mixture of $B_{10}H_{12}CN(CH_3)_3$ (10 g.), 7 g. of sodium dispersion (50% in oil) and 200 ml. of tetrahydrofuran was refluxed in a nitrogen atmosphere for seven hours. The mixture was filtered. $NaB_{10}H_{10}CH$ was present in the filtrate. The filter cake was added to 300 ml. of ethanol. The solution was filtered and the filtrate was concentrated under reduced pressure in a stream of air. The concentrate was diluted with water and this solution was filtered through diatomaceous earth ("Celite"). The addition of 50% aqueous cesium hydroxide solution precipitated $CsB_{10}H_{12}CH$ which was recrystallized twice from water before analysis.

*Analysis.*—Calcd. for $CsB_{10}H_{12}CH$: B, 40.5; C, 4.5; H, 4.9. Found: B, 41.3; C, 5.0; H, 5.0. The infrared absorption spectrum was consistent with the assigned structure.

Example VI

A mixture of $B_{10}H_{12}CN(CH_3)_3$ (20 g.) 18 g. of sodium dispersion (50% in oil) and 400 ml. of tetrahydrofuran was refluxed for approximately 18 hours in a nitrogen atmosphere. The mixture was cooled and 100 ml. of ethanol was added. The resulting solution was evaporated and the residue was extracted with 200 ml. of water. The extracts were filtered and acidified with hydrochloric acid. The addition of excess trimethylammonium chloride precipitated $(CH_3)_3NHB_{10}H_{12}CH$ which was separated by filtration. The filtrate contained $B_{10}H_{10}CH^-$ in combination with both $Na^+$ and $(CH_3)_3NH^+$. The $(CH_3)_3NHB_{10}H_{12}CH$ was purified by brief digestion in 300 ml. of boiling water, followed by cooling and filtering of the mixture. The yield was 11.4 g.; the identity of the product was confirmed by infrared analysis.

All of the compounds of the invention are useful in preparing printed circuits, or in copying processes, as shown in the following examples:

EXAMPLE A

A pattern was drawn on a piece of paper with an acetonitrile solution of $(CH_3)_3NHB_{10}H_{12}CH$. The acetonitrile was allowed to evaporate. The paper was then sprayed with an acetonitrile solution of palladium chloride. The palladium chloride which came in contact with the $(CH_3)_3NHB_{10}H_{12}CH$ was reduced to palladium metal, forming a black image. The excess palladium chloride was rinsed off with water. The same result was obtained when $(CH_3)_3NHB_{10}H_{10}CH$ was used in place of $(CH_3)_3NHB_{10}H_{12}CH$ This process can be used to form a printed circuit useful in electrical applications.

The process can be modified to serve as a copying process by preparing a master stencil by perforating an acetonitrile-resistant sheet of plastic or cardboard or metal in the design to be copied. The perforations will be in the shape of letters when copying printed material. This stencil can be held tightly against the paper or other material on which it is desired to copy the image and the acetonitrile solution of $(CH_3)_3NHB_{10}H_{12}CH$ sprayed through the stencil onto the paper. The process can then be continued as in Example A. The stencil may be reused to form the same image. The same result can be obtained with $(CH_3)_3NHB_{10}H_{10}CH$ in place of $(CH_3)_3NHB_{10}H_{12}CH$ In addition, the novel compounds of this invention having the formula $MB_{10}H_{12}CH$ are useful in preparing "sandwich" compounds in which one or two $B_{10}H_{10}CH_3^-$ anions are bonded to a transition-metal atom, by reaction with a lower alkyllithium and a metallic chloride.

The foregoing detailed description has been given for clearness of understanding only and no unnecessary limitations are to be understood therefrom. The invention is not limited to the exact details shown and described, for obvious modifications will occur to those skilled in the art.

The embodiments of the invention in which an exclusive property or privilege is claimed are defined as follows:

1. A compound selected from the class consisting of $M[B_{10}H_{12}CH]$ and $M[B_{10}H_{10}CH]$ wherein $[B_{10}H_{12}CH]$ and $[B_{10}H_{10}CH]$ are anions of valence $-1$, and M is a cation selected from the class consisting of hydrogen, an alkali metal, one equivalent of an alkaline-earth metal, ammonium, aliphatically saturated hydrocarbyl-substituted ammonium, and tri(aliphatically saturated hydrocarbyl-substituted) sulfonium.

2. The compounds of claim 1 wherein M is hydrogen.
3. The compounds of claim 1 wherein M is $(CH_3)_4N$.
4. The compounds of claim 1 wherein M is $(CH_3)_3NH$.
5. The compounds of claim 1 wherein M is Cs.
6. The compound of claim 1 having the formula $(CH_3)_4N[B_{10}H_{12}CH]$.
7. The compound of claim 1 having the formula $Cs[B_{10}H_{12}CH]$.
8. The compound of claim 1 having the formula $(CH_3)_4N[B_{10}H_{10}CH]$.
9. Process for preparing compounds of the formula $M[B_{10}H_{12}CH]$ and $M[B_{10}H_{10}CH]$ wherein M is sodium, lithium or potassium, which comprises reacting a compound of the formula $B_{10}H_{12}CNR_3$ wherein each R is of up to 18 carbon atoms and is alkyl, cycloalkyl or aralkyl, bonded to the nitrogen through carbon bearing at least one hydrogen; with sodium, lithium or potassium in an inert solvent at a temperature of between 35 and 150° C.

No references cited.

CHARLES B. PARKER, *Primary Examiner.*

S. T. LAWRENCE III, *Assistant Examiner.*